United States Patent
Wang et al.

(10) Patent No.: US 11,479,689 B2
(45) Date of Patent: Oct. 25, 2022

(54) ANTI-FOGGING MATERIAL AND MANUFACTURING METHOD THEREOF

(71) Applicant: INDUSTRIAL TECHNOLOGY RESEARCH INSTITUTE, Hsinchu (TW)

(72) Inventors: Li-Ching Wang, Hsinchu (TW); Yuan-Yin Chen, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/139,119

(22) Filed: Dec. 31, 2020

(65) Prior Publication Data

US 2022/0204804 A1 Jun. 30, 2022

(51) Int. Cl.
*C09D 133/14* (2006.01)
*C08F 220/28* (2006.01)
*C09D 4/00* (2006.01)
*C09D 5/00* (2006.01)

(52) U.S. Cl.
CPC ........ *C09D 133/14* (2013.01); *C08F 220/281* (2020.02); *C09D 4/00* (2013.01); *C09D 5/00* (2013.01); *C08F 2800/20* (2013.01)

(58) Field of Classification Search
CPC ............ C08F 220/281; C08F 2800/20; C09D 133/14; C09D 4/00; C09D 5/00
See application file for complete search history.

(56) References Cited

U.S. PATENT DOCUMENTS

| | | | |
|---|---|---|---|
| 10,241,237 B2 | 3/2019 | Jing et al. | |
| 10,266,718 B2 | 4/2019 | Peng et al. | |
| 2010/0215928 A1 | 8/2010 | Murayama et al. | |
| 2018/0072832 A1* | 3/2018 | Huang | C08L 33/02 |
| 2020/0157302 A1 | 5/2020 | Jing et al. | |

FOREIGN PATENT DOCUMENTS

| | | |
|---|---|---|
| CN | 108504150 | 9/2018 |
| CN | 109280202 | 1/2019 |
| CN | 109957322 | 7/2019 |
| CN | 110437699 | 11/2019 |
| CN | 111484785 | 8/2020 |
| CN | 111684030 | 9/2020 |
| TW | I294907 | 3/2008 |
| TW | I376408 | 11/2012 |
| TW | I545996 | 8/2016 |
| TW | I621531 | 4/2018 |
| TW | 201825643 | 7/2018 |
| TW | I699918 | 7/2020 |

OTHER PUBLICATIONS

Yuan et al., machine English translation of CN108504150 (Year: 2018).*
Iseda et al., machine English translation of CN111684030 (Year: 2020).*
Taiwanese Office Action for Taiwanese Patent Application No. 110114725 dated Oct. 29, 2021.

* cited by examiner

*Primary Examiner* — Jessica M Roswell
(74) *Attorney, Agent, or Firm* — Amin, Turocy & Watson, LLP

(57) ABSTRACT

The present disclosure provides an anti-fogging material and a manufacturing method thereof. The anti-fogging material includes a crosslinked polymer obtained by curing an anti-fogging composition, wherein the anti-fogging composition includes an ionic compound, a hard compound with two or more acrylate functional groups at the terminus thereof, and a surface active compound.

8 Claims, No Drawings

ANTI-FOGGING MATERIAL AND MANUFACTURING METHOD THEREOF

TECHNICAL FIELD

The present disclosure is directed to anti-fogging materials and manufacturing methods thereof, and more particularly, to an anti-fogging and abrasion-resistant material and a manufacturing method thereof.

BACKGROUND

A clear sight is very important in life. There are many conditions in the environment that produce temperature differences, which cause fogging. Fog causes problems such as reduced light penetration or decreased visual clarity. In addition to the inconvenience in general use, it further affects the safety of driving and work, which ranges from inconvenience to life to endangered life safety. For example, the fog generated by helmet lenses or automobile windshield affects the driver's sight; the fogging of the safety goggles of the engineers increases the risk of construction; the fogging of frozen food display windows and bathroom mirrors causes unclear vision; and the fog on agricultural greenhouse glass film condenses into water droplets, causing moisture to affect the quality of the product. Therefore, there is always a demand for anti-fogging products in the market.

Most of the anti-fogging coatings materials currently in the market use surfactant sprays as temporary anti-fogging coatings, which have short use times and are not resistant to wiping. Anti-fogging materials are mainly divided into two types, hydrophobic and hydrophilic. Hydrophobic materials have low surface tensions, which can prevent water droplets from rolling on the surface of the material and achieve an anti-fogging effect. However, when the anti-fogging effect is actually tested, the anti-fogging effect is found to be limited. A hydrophilic material has a large surface tension, which can flatten the water droplets into a water film, and its anti-fogging effect is better than that of the hydrophobic type. However, since the hydrophilic material is limited by the soft structure of the compound, it cannot resist external forces, and easily falls off due to friction. The present disclosure intends to solve such phenomenon by introducing a hard compound to improve the physical properties of the hydrophilic coatings.

SUMMARY

The present disclosures provides an anti-fogging material, comprising a cross-linked polymer obtained by curing an anti-fogging composition, wherein the anti-fogging composition comprises:

an ionic compound having a structure represented by formula (I);

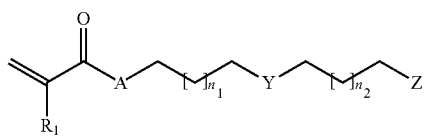

wherein $n_1$ and $n_2$ are integers from 0 to 3, A is O or NH, $R_1$ is H or C1 to C6 alkyl, Y is

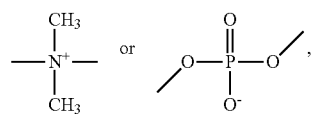

and Z is

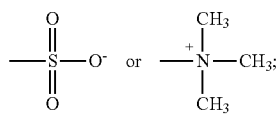

a hard compound with two or more acrylate functional groups at the terminus; and a surface active compound having a structure represented by formula (II);

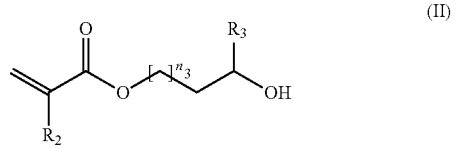

wherein $n_3$ is an integer from 0 to 6, and $R_2$ and $R_3$ are independently H or a C1 to C6 alkyl group.

The present disclosure further provides a method for preparing an anti-fogging material, comprising the following steps of: mixing the anti-fogging composition of the present disclosure to form a solution; degassing the solution; applying the solution to the substrate; and irradiating the substrate coated with the solution is with UV light to form the anti-fogging material.

DETAILED DESCRIPTION

The implementation modes of the present disclosure will be illustrated in the following specific embodiments, anyone skilled in the art can easily realize the advantages and effects of the present disclosure based on the disclosure of the present specification. The present disclosure can also be performed or applied by other different implementation modes, and each of the details in the present specification each can be differently modified and altered based on different views and applications, without departing from the spirit of the present disclosure. Furthermore, all of the ranges and values herein are inclusive and combinable. Any numerical value or point fallen within the disclosed herein, such as any integers, can be used as the lower or upper limit to derive a subrange.

The present disclosure provides an anti-fogging material, which uses an acrylic aqueous ionic compound as an anti-fogging body, and uses a surface active compound (hydrophilic compound) as a miscible medium, which can introduce an acrylic hard compound into the ionic compound to form a cross-linked network structure, which can take into account the anti-fogging effect and the physical properties. When water droplets condense on the surface of the material, the high surface energy of the ionic compound will make the water droplets flat and unable to form water droplets, thereby achieving the effect of anti-fogging, while the hard compound can strengthen the hardness of the aqueous material and make it resistant to wiping, and extend the service life. The anti-fogging material disclosed in the present disclosure can solve the problem of poor physical properties of the anti-fogging material.

Specifically, the anti-fogging material disclosed in the present disclosure comprises a cross-linked polymer obtained by curing an anti-fogging composition, wherein the anti-fogging composition comprises: an ionic compound, a hard compound with two or more acrylate functional groups at the end, and a surface active compound.

The ionic compound is a compound having the structure represented by formula (I):

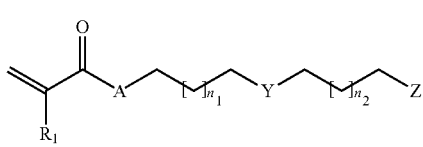

wherein $n_1$ and $n_2$ are integers from 0 to 3, A is O or NH, $R_1$ is H or C1 to C6 alkyl, Y is

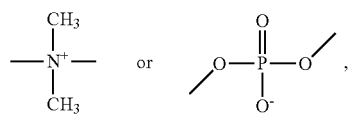

and Z is

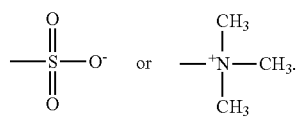

The surface active compound is a compound having a structure represented by formula (II);

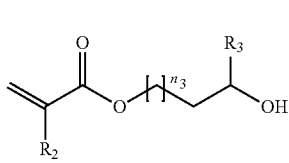

wherein $n_3$ is an integer from 0 to 6, and $R_2$ and $R_3$ are independently H or a C1 to C6 alkyl group.

The ionic compound mainly provides the effect of anti-fogging, the hard compound mainly provides the effect of abrasion resistance and a high level of hardness, and the surface active compound provides the effects of miscibility and dispersion of the ionic compound and the hard compound.

The main components of the anti-fogging composition disclosed in the present disclosure comprise an ionic compound and a hard compound. A suitable surface active compound is selected to cause the two to undergo a cross-linking reaction, so that the anti-fogging material has both good anti-fogging and physical properties. The ionic compound is highly hydrophilic, and the water contact angle after film formation is mostly lower than 10°. The hard compound is hydrophobic, and the water contact angle after film formation is mostly higher than 90°. When two molecules of different properties are mixed, it is like mixing water and oil, which causes obvious phase separation that prevents the cross-linking reaction from proceeding. Therefore, it is necessary to select an appropriate surface active compound, which has an aqueous functional group at one end and a hydrophobic functional group at the other end, so that it can react with oil and water at the same time to make the two mix uniformly.

The main components of the anti-fogging composition of the present disclosure comprise an ionic compound, a hard compound and a surface active compound. The surface active compound can disperse the hydrophilic ionic compound and the lipophilic hard compound and undergo cross-linking reactions to form an anti-fogging coating and having low water contact angle, anti-fogging ability, high pencil hardness and abrasion resistance. The anti-fogging composition has good film-forming properties, can be cured by light and heat to increase reaction efficiency.

In an embodiment, in the main components of the anti-fogging composition of the present disclosure, the weight percentage of the ionic compound is 13 to 27%, the weight percentage of the surface active compound is 49 to 66%, and the weight percentage of the hard compound is 20 to 27%. In other embodiments, the weight percentage of the ionic compound may be 13, 14, 15, 16, 17, 18, 19, 20, 21, 22, 23, or 24%. The weight percentage of the hard compound may be 49, 50, 51, 52, 53, 54, 55, 56, 57, 58, 59, 60, 61, 62, 63, 64, 65 or 66%. The weight percentage of the surface active compound may be 20, 21, 22, 23, 24, 25, 26 or 27%.

In an embodiment, the ionic compound may be acrylamide and acrylate compounds, and the carbon chain structure has highly polar hydrophilic functional groups, such as quaternary amine salts, sulfates, and phosphates. The ionic compound may be selected from (3-[dimethyl-[2-(2-methylprop-2-enoyloxy)ethyl]azaniumyl]propane-1-sulfonate), 2-methacryloxyethyl phosphocholine (MPC), and methacryloxyethyltrimethyl ammonium chloride.

In an embodiment, the ionic compound may be

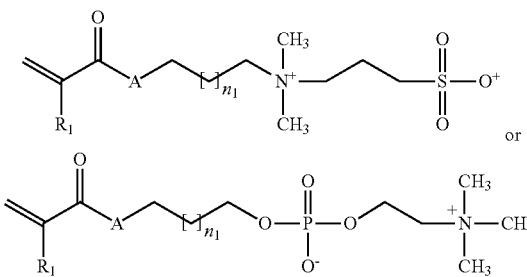

$n_1$ and $n_2$ are integers from 0 to 3, A is O or NH, and $R_1$ is H or C1 to C6 alkyl.

In an embodiment, the hard compound may be aliphatic polyurethane, acrylate, hexaacrylate compound, and the terminal thereof has two or more acrylate functional groups. The hard compound may be selected from pentaerythritol tetraacrylate, pentaerythritol triacrylate, and neopentyl glycol diacrylate.

In an embodiment, the surface active compound may be an acrylate compound, and the tail end thereof can have a hydroxyl group. The surface active compound may include at least one selected from the group consisting of hydroxyethyl methacrylate (HEMA), hydroxyethyl acrylate (HEA), hydroxypropyl acrylate (HPA) and hydroxybutyl acrylate (HBA).

In an embodiment, the anti-fogging material of the present disclosure has a transmittance that may be greater than or equal to 90%. such as 90%, 91%, or 92%.

In an embodiment, the anti-fogging material of the present disclosure having a haze value that may be equal to or less than 1.1, such as 1.1, 1, 0.9 or 0.83%.

In an embodiment, the anti-fogging material of the present disclosure has a pencil hardness of that may be greater than or equal to 3H, such as 3H, 4H, 5H, 6H or 7H.

In an embodiment, the anti-fogging material of the present disclosure has an abrasion resistance that does not produce scars on the film material, by abrading a 5 to 10 μm film formed by the anti-fogging material with a #0000 steel wool under a load of 250 g 100 times according to the ASTM D6279 method.

In an embodiment, the anti-fogging material of the present disclosure has passed the UV aging test for more than 90 hours, and more specifically, it may pass the UV aging test for 92, 94, 96, 98, 100 or more than 100 hours.

In an embodiment, the anti-fogging material of the present disclosure is a film material with a thickness of 10 to 200 μm, such as 10 to 100 μm, or 10 to 50 μm. The thickness herein can be adjusted according to the environmental requirements of the anti-fogging material.

In an embodiment, the anti-fogging material of the present disclosure further comprises a diluent. For example, the diluent is at least one selected from the group consisting of acetone, methyl ethyl ketone, n-butyl acetate and propylene glycol methyl ether.

The present disclosure further provides a method for preparing an anti-fogging material, comprising the following steps of: mixing the anti-fogging composition of the present disclosure to form a solution; degassing the solution; applying the solution to the substrate; and irradiating the substrate coated with UV light to form the anti-fogging material.

In an embodiment, the step of forming the solution comprises mixing the ionic compound and the surface active compound to form a mixture; and adding the hard compound to the mixture to form the solution.

In an embodiment, according to the preparation method of the anti-fogging material of the present disclosure, the ionic compound and the surface active compound are pre-mixed (referred to as solution A) at a weight ratio of 0.1 to 4.2 to 0.5 to 9 and stirred for 1 to 5 hours. After solution A is uniformly mixed, it is put in an ultrasonic oscillator and oscillated for 2 to 10 minutes, so that the air bubbles in solution A are dispersed and appear transparent. Then, a hard compound with a weight ratio of 0.15 to 5 is added, and stirred for 0.5 to 1 hour (referred to as solution B). After solution B is evenly mixed, it is placed in an ultrasonic oscillator, and oscillated for 5 minutes to remove the air bubbles. Then, a wire rod of 5 to 100 μm is applied on the substrate, and oven is used to for thermal curing or an UV light is used to cure to obtain an anti-fogging film with a film thickness of 3 to 50 μm.

In an embodiment, in the method for preparing the anti-fogging material disclosed in the present disclosure, the substrate may be glass, polycarbonate, polyethylene terephthalate, or other transparent material. The transparent material may have a light transmittance that is greater than or equal to 50%.

The present disclosure illustrates the details through examples of embodiments. However, the interpretation of the present disclosure should not be limited to the description of the following embodiments.

Example 1

The preparation procedures, each of the compounds, and the conditions of Example 1 of the present disclosure are described as follows. A 30 ml sample bottle was used, and a stir bar was put in, and 1.4 g of an ionic compound (2-(methacryloyloxy)ethyl]dimethyl-(3-sulfopropyl)ammonium hydroxide, CAS 3637-26-1) and 6.6 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles, and then 2.0 g of a hard compound (pentaerythritol tetraacrylate, CAS 4986-89-4) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and took out. The coating was put on a UV conveyor belt, and cured with a D lamp to obtain a 5 μm anti-fogging film.

Example 2

The preparation procedures, each of the compounds, and the conditions of Example 2 of the present disclosure are described as follows. A 30 ml sample bottle was used, and a stir bar was put in, and 2.4 g of an ionic compound (2-(methacryloyloxy)ethyl]dimethyl-(3-sulfopropyl)ammonium hydroxide, CAS 3637-26-1) and 4.9 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles, and then 2.7 g of a hard compound (pentaerythritol tetraacrylate, CAS 4986-89-4) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Example 3

The preparation procedures, each of the compounds, and the conditions of Example 3 of the present disclosure are described as follows. A 30 ml sample bottle was used, and a stir bar was put in, and 1.4 g of an ionic compound ([3-(methacryloylamino)propyl(3-sulfonatopropyl)dimethylaminium, CAS. 5205-95-8) and 6.6 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles, and then 2.0 g of a hard compound (pentaerythritol tetraacrylate, CAS 4986-89-4) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Example 4

The preparation procedures, each of the compounds, and the conditions of Example 4 of the present disclosure are described as follows. A 30 ml sample bottle was used and a stir bar was put in, and 1.4 g of an ionic compound (2-methacryloyloxyethyl phosphorylcholine, CAS. 67881-98-5) and 6.6 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles, and then 2.0 g of a hard compound (pentaerythritol tetraacrylate, CAS 4986-89-4) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Example 5

The preparation procedures, each of the compounds, and the conditions of Example 5 of the present disclosure are described as follows. A 30 ml sample bottle was used, and a stir bar was put in, and 2.7 g of an ionic compound (2-(methacryloyloxy)ethyl]dimethyl-(3-sulfopropyl)ammonium hydroxide, CAS 3637-26-1) and 5.3 g of a surface active compound (2-hydroxyethyl acrylate, CAS 818-61-1) were added. The mixture was stirred at room temperature for 3 hours. After mixing uniformly, it was put in an ultrasonic oscillator for 5 minutes to remove the air bubbles, and then 2.0 g of a hard compound (pentaerythritol tetraacrylate, CAS 4986-89-4) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Example 6

The preparation procedures, each of the compounds, and the conditions of Example 6 of the present disclosure are described as follows. A 30 ml sample bottle was used, and a stir bar was put in, and 1.3 g of an ionic compound (2-(methacryloyloxy)ethyl]dimethyl-(3-sulfopropyl)ammonium hydroxide, CAS 3637-26-1) and 6.1 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles, and then 2.6 g of a hard compound (pentaerythritol triacrylate, CAS 3524-68-3) was added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Comparative Example 1

The preparation procedures, each of the compounds, and the conditions of Comparative Example 1 of the present disclosure are described as follows. A 30 ml sample bottle was used, and a stir bar was put in, and 3.2 g of an ionic compound (2-(methacryloyloxy)ethyl]dimethyl-(3-sulfopropyl)ammonium hydroxide, CAS 3637-26-1) and 6.8 g of a surface active compound (2-hydroxyethyl methacrylate, CAS 868-77-9) were added. The mixture was stirred at room temperature for 3 hours. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Comparative Example 2

The preparation procedures, each of the compounds, and the conditions of Comparative Example 2 of the present disclosure are described as follows. A 30 ml sample bottle was used, and a stir bar was put in, and 4.6 g of an ionic compound (2-(methacryloyloxy)ethyl]dimethyl-(3-sulfopropyl)ammonium hydroxide, CAS 3637-26-1) and 5.4 g of a hard compound (pentaerythritol tetraacrylate, CAS 4986-89-4) were added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Comparative Example 3

The preparation procedures, each of the compounds, and the conditions of Comparative Example 3 of the present disclosure are described as follows. A 30 ml sample bottle was used, and a stir bar was put in, and 6.4 g of a surface active compound (2-hydroxyethyl methacrylate, CAS. 868-77-9) and 3.6 g of a hard compound (Pentaerythritol tetraacrylate, CAS 4986-89-4) were added. After mixing uniformly, it was put in an ultrasonic oscillator for 5 minutes to remove the air bubbles. The above solution was applied on a 125 μm PET film with a 25 μm wire rod, and it was put in an oven at 90° C. for 1 minute, and be taken out. The coating was put on a UV conveyor belt, and cured with a D lamp to obtain a 5 μm anti-fogging film.

Table 1 lists the proportions of the components in Examples 1 to 6 and Comparative Examples 1 to 4.

TABLE 1

| Number/weight percentage (%) | Ionic compound A | Ionic compound B | Ionic compound C | Surface active compound A | Surface active compound B | Hard compound A | Hard compound B |
|---|---|---|---|---|---|---|---|
| Example 1 | 14 | | | 66 | | 20 | |
| Example 2 | 24 | | | 49 | | 27 | |
| Example 3 | | 14 | | 66 | | 20 | |
| Example 4 | | | 14 | 66 | | 20 | |
| Example 5 | 27 | | | | 53 | 20 | |
| Example 6 | 13 | | | 61 | | | 26 |

TABLE 1-continued

| Number/ weight percentage (%) | Ionic compound A | Ionic compound B | Ionic compound C | Surface active compound A | Surface active compound B | Hard compound A | Hard compound B |
|---|---|---|---|---|---|---|---|
| Comparative Example 1 | 32 | | | 68 | | | |
| Comparative Example 2 | 46 | | | | | 54 | |
| Comparative Example 3 | | | | 64 | | 36 | |

The structure of each of the compounds is as follows:

Ionic compound A:

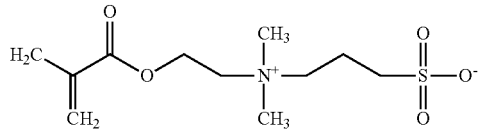

Ionic compound B:

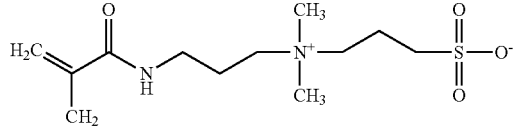 [SMILES: C=C(C)C(=O)NCCC[N+](C)(C)CCCS(=O)(=O)[O-]]

Ionic compound C:

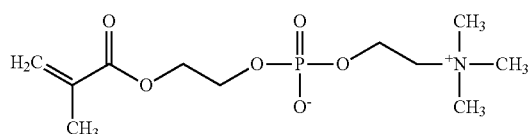

Surface active compound A:

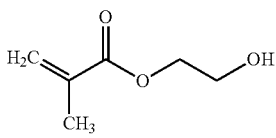

Surface active compound B:

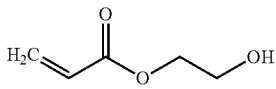

Hard compound A:

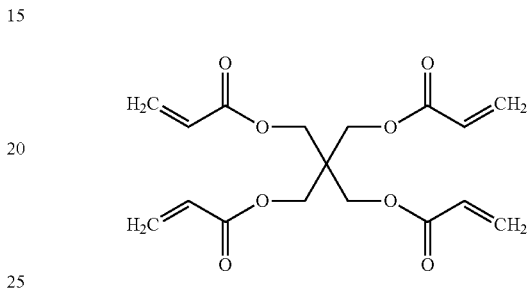

Hard Compound B:

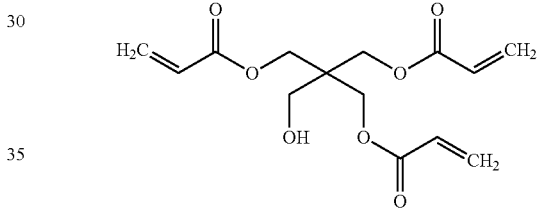

Test Method

Anti-Fogging Test at −40° C.

The anti-fogging coating was applied to a 125 μm PET substrate, and the film thickness was controlled to 5-10 μm. The substrate was placed in freezer at −40° C. for 4 hours, and then be taken out. The fogging condition was observed with naked eyes.

Anti-Fogging Test at 70° C.

The anti-fogging coating was applied to a 125 μm PET substrate, and the film thickness was controlled to 5-10 μm. The substrate was heated with water vapor at 70° C. for 5 minutes, and then be taken out. The fogging condition was observed with naked eyes.

Pencil Hardness Test

The anti-fogging coating was applied to a 125 μm PET substrate, and the film thickness was controlled to 5-10 μm. The pencil hardness of the film was tested according to ASTM D3363. Among the 5 lines tested, and 3 lines without cracking the film was considered as pass. The load used was 500 g.

Abrasion Resistance Test

The anti-fogging coating was applied to a 125 μm PET substrate, and the film thickness was controlled to 5-10 μm. The abrasion resistance of the film was tested according to ASTM D6279. #0000 steel wool was used, and 100 times abrasion was carried out under a load of 250 g. The results were recorded in three grades: 1. no damage, 2. slight damage (less than 10 scars), and 3. failure (more than 10 scars).

Transmittance (T.T %) Test

A haze meter (Nippon Denshoku-NDH7000), which can measure the quality of a plastic film, cellophane, polyethylene, glass and an LCD touch panel, and turbidity (haze) and transmittance (T.T %), scattered light transmittance, and parallel light transmittance, was used. According to the ASTM D1003 protocol, the value of transmittance (T.T %) could be obtained.

Haze Test

A haze meter (Nippon Denshoku-NDH7000), which can measure the quality of a plastic film, cellophane, polyethylene, glass and an LCD touch panel, and turbidity (haze) and transmittance (T.T %), scattered light transmittance, and parallel light transmittance, was used. According to the ASTM D1003 protocol, the value of haze could be obtained.

UV Aging Test

An ATLAS weathering tester (Lianhuan Technology Co., Ltd.) was used to test. According to ASTM-G154 protocol, samples were taken out at regular intervals, and was tested for the maintenance of the anti-fogging effect with 60° C. hot water. The highest resistance times (hours) were recorded.

Table 2 lists the test results of the anti-fogging materials prepared from Examples 1 to 6 and Comparative Examples 1 to 3.

TABLE 2

| Number/Test | Anti-Fogging at −40° C. | Anti-Fogging at 70° C. | Pencil Hardness | Abrasion Resistance | Transmittance (T.T%) | Haze (%) | UV Aging (hours) |
|---|---|---|---|---|---|---|---|
| Example 1 | No fog | No fog | 7H | No damage | 92.26 | 0.83 | 99 |
| Example 2 | No fog | No fog | 6H | No damage | 92.19 | 0.89 | 96 |
| Example 3 | No fog | No fog | 4H | No damage | 92.08 | 0.93 | 96 |
| Example 4 | No fog | No fog | 3H | No damage | 92.11 | 0.92 | 94 |
| Example 5 | No fog | No fog | 5H | No damage | 92.07 | 0.94 | 96 |
| Example 6 | No fog | No fog | 3H | No damage | 92.09 | 0.98 | 94 |
| Comparative Example 1 | No fog | No fog | 2H | Failure | 92.07 | 0.99 | 90 |
| Comparative Example 2 | Fogging | Fogging | 4H | Slight damage | 91.98 | 3.01 | 89 |
| Comparative Example 3 | No fog | Fogging | 5H | No damage | 92.06 | 1.19 | 94 |

It can be seen from Table 2 that the anti-fogging material made from the anti-fogging composition of the present disclosure has a good anti-fogging effect at −40° C. and 70° C. without fogging, and the transmittance thereof is greater than 90%, the haze thereof is less than 0.9%, and the pencil hardness thereof is greater than 3H to 7H. Hence, a use can choose an anti-fogging material with appropriate hardness according to different environments. The anti-fogging material would not have scars generated when it is worn on #0000 steel wool with a load of 250 g for 100 times. It can pass the UV aging test for more than 94 hours. It can be seen that the anti-fogging material of the present disclosure has both anti-fogging and abrasion resistance functions, such that it has better weather resistance and can be used in outdoor or harsher environments.

It can be seen from Table 2 that the anti-fogging composition of Comparative Example 1 does not contain hard compounds. Therefore, although the prepared anti-fogging material has anti-fogging effect, the pencil hardness is less than 3H, indicating that the hardness is not enough, and it cannot pass the abrasion resistance.

It can be seen from Table 2 that the anti-fogging composition of Comparative Example 2 does not contain surface active compounds, so the ionic compound and the hard compound have poor miscibility and dispersion effect. Therefore, the anti-fogging material prepared has no anti-fogging effect, indicating no applicability.

It can be seen from Table 2 that the anti-fogging composition of Comparative Example 3 does not contain ionic compounds, so that the anti-fogging material obtained has poor anti-fogging effect, and the haze is greater than 1.1%, indicating poor applicability.

It can be seen from Table 2 that the anti-fogging materials prepared by the anti-fogging composition not disclosed in the present disclosure have at least one unsatisfactory result.

The anti-fogging material prepared by the anti-fogging composition of the present disclosure is a single-layer organic polymer with a network structure. The anti-fogging composition is made of an anti-fogging material through a UV curing process. The process is simple and can be customized on different materials and product surfaces.

The above embodiments are set forth to illustrate the principles of the present disclosure, and should not be interpreted as to limit the present disclosure in any way. The above embodiments can be modified by one of ordinary skill in the art without departing from the scope of the present disclosure as defined in the appended claims.

What is claimed is:

1. An anti-fogging material, comprising a cross-linked polymer obtained by curing an anti-fogging composition, wherein the anti-fogging composition comprises:

an ionic compound having a structure represented by formula (I):

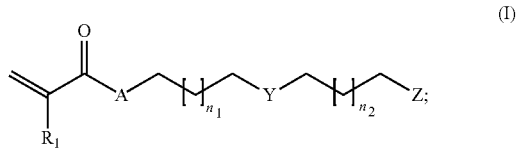

wherein $n_1$ and $n_2$ are integers from 0 to 3, A is O or NH, $R_1$ is H or C1 to C6 alkyl, Y is

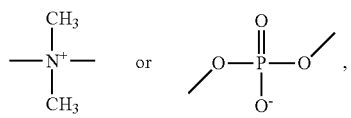

and Z is

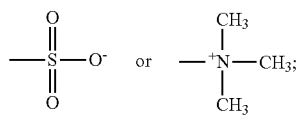

a hard compound with two or more acrylate functional groups at a terminus thereof; and a surface active compound having a structure represented by formula (II):

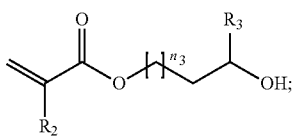

wherein $n_3$ is an integer from 0 to 6, and $R_2$ and $R_3$ are independently H or a C1 to C6 alkyl group, wherein a weight percentage of the ionic compound is 13 to 27%, a weight percentage of the surface active compound is 49 to 66%, and a weight percentage of the hard compound is 20 to 27%, based on a total weight of the anti-fogging composition.

2. The anti-fogging material of claim 1, which has a transmittance that is greater than or equal to 90%.

3. The anti-fogging material of claim 1, which has a haze that is equal to or less than 1.1%.

4. The anti-fogging material of claim 1, which has a pencil hardness that is greater than or equal to 3H.

5. The anti-fogging material of claim 1, wherein the ionic compound is

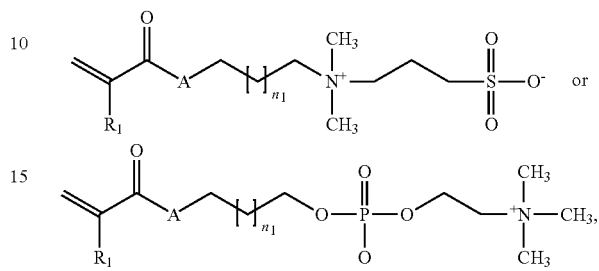

and wherein $n_1$ is an integer from 0 to 3, A is O or NH, and $R_1$ is H or C1 to C6 alkyl.

6. The anti-fogging material of claim 1, which is a film with a thickness of 10 to 200 μm.

7. A method for preparing an anti-fogging material, comprising the following steps of:
  mixing the anti-fogging composition of claim 1 to form a solution;
  degassing the solution;
  applying the solution to a substrate; and
  irradiating the substrate coated with the solution with UV light to form the anti-fogging material.

8. The method of claim 7, wherein the step of forming the solution comprises:
  mixing the ionic compound and the surface active compound to form a mixture; and
  adding the hard compound to the mixture to form the solution.

* * * * *